Figure 1:
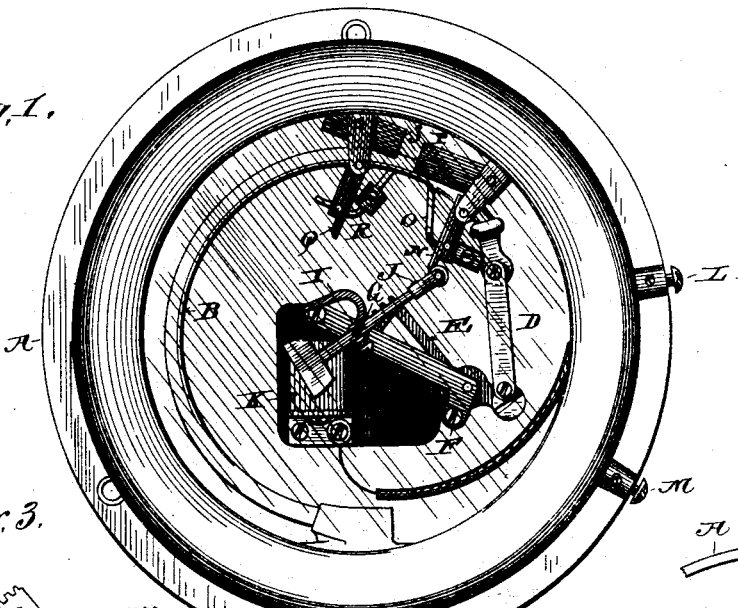

(No Model.)

B. B. WARD.
CIRCUIT CONTROLLER FOR REGULATORS.

No. 513,545. Patented Jan. 30, 1894.

Attest:
C. W. Benjamin.
Delbert H. Decker.

Inventor:
Barton B. Ward
by H. L. Townsend
Atty.

UNITED STATES PATENT OFFICE.

BARTON B. WARD, OF NEW YORK, N. Y.

CIRCUIT-CONTROLLER FOR REGULATORS.

SPECIFICATION forming part of Letters Patent No. 513,545, dated January 30, 1894.

Application filed May 10, 1893. Serial No. 473,698. (No model.)

*To all whom it may concern:*

Be it known that I, BARTON B. WARD, a subject of the Queen of Great Britain, and a resident of New York, in the county of New York and State of New York, have invented a certain new and useful Circuit-Controller for Regulators, of which the following is a specification.

My invention relates to electric circuit controllers for regulators of various sorts, as, for example, temperature regulators, operating ventilators or dampers, or pressure regulators, operating valves or pumps, or electric current regulators for making or breaking generator circuits generally.

The object of my invention is to provide an automatic circuit controlling contact that will have a desired amount of lost motion and then make or break the circuit with an instantaneous snap. Further, to so construct said contact that it may be operated by a device sensitive to fluctuations of fluid pressure, as a Bourdon tube, or by a device sensitive to changes of temperature as a bi-metallic bar. As an instance, it is desirable in dispensing malt liquors to maintain upon said liquors a pressure of air or gas which shall not drop below a certain fixed limit, say fifteen pounds, nor rise above another certain fixed limit, say twenty pounds. To accomplish this the compressor must be thrown into operation at the instant the pressure has dropped to the minimum and continue in operation until the maximum pressure has been reached; then it should be thrown out of operation and remain inactive till the pressure has again dropped to the minimum. By constructing the regulator so as to provide this range of five pounds, the compressor is allowed quite an interval of rest between the periods of activity. In this way the life of the compressor is prolonged and a better effect is produced than when the attempt is made to keep the pressure constant at a fixed degree, in which case the compressor is constantly starting and stopping. This same interval of rest is desirable for the magnet, electric motor, or whatever other device may be used in actuating or controlling the operation of ventilators, dampers, valves or electric switches. My invention effectively controls these actuating devices by the moving contact gradually turning through an interval of lost motion till the desired degree is reached and then snapping past that point and into position where circuit will be made or broken as the case may be. Then in reversing, it again gradually passes to a certain point when it suddenly snaps by that point and instantaneously changes to opposite condition where circuit is broken or made.

My invention therefore consists of a circuit controller in which a movable contact is actuated by a fluid pressure affected device or by a temperature affected device, is allowed a desired amount of lost motion, and makes and breaks the circuit with an instantaneous snap.

It also consists in details of construction hereinafter described and pointed out in the claims.

I will now describe the construction and application of my invention, reference being had to the accompanying drawings which form a part of the specification and in which like letters of reference designate like parts.

Figure 3:
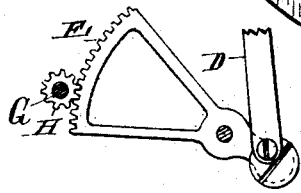
Figure 4:
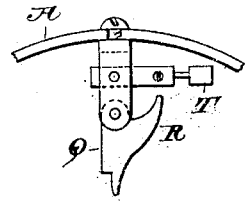
Figure 5:
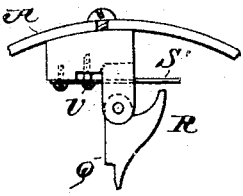
Figure 2:
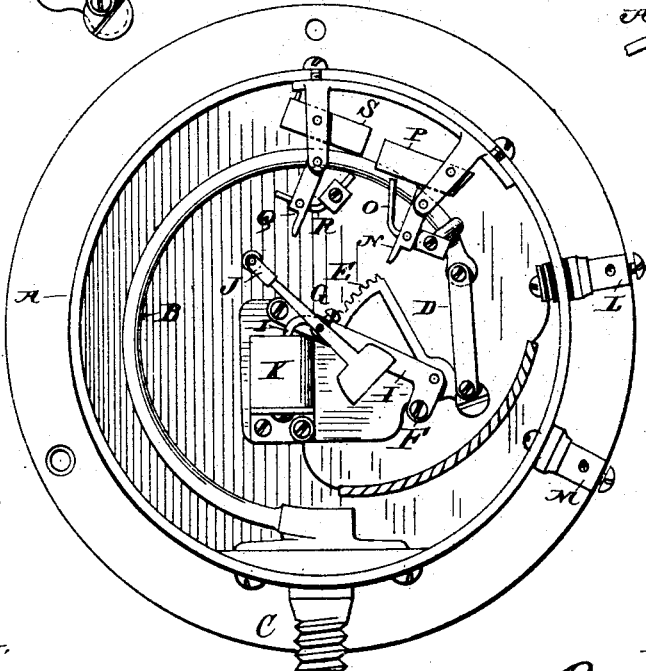

Figure 1, is a face view of my circuit controller with the parts in their normal operative condition. Fig. 2, is a like view with the glass cover removed and the parts in the positions taken by them when they close the circuit. Fig. 3, is a detail view showing the gearing for operating the movable circuit closer; and Figs. 4 and 5, are modifications of the retarding mechanism.

A, represents the case which may be of cast iron or any other suitable material.

B, represents a Bourdon tube or a bi-metallic bar, as the case may be, secured to the wall of the case. If a Bourdon tube, then a screw threaded coupling will extend therefrom through the case as at C.

To the inner end of the expanding and contracting member B, is pivoted a link D, which in turn is pivoted to the counterbalance of the sector gear E. This sector gear is mounted on a shaft in frame F. In this frame is also mounted the shaft G, carrying the small pinion H, with which the sector meshes and also carrying on its outer end the movable curved contact I, and its governing arm J. The arm J, is provided at its upper end with an anti-friction roller, and at its lower end with a counterweight. The contact I, co-operates with a mercury contact K, mounted upon a piece of insulation attached to frame F. This mercury contact is connected to the insulated binding post L, while the case forms the conductor between the movable contact I and the binding post M.

The movements of contact I, are controlled through the arm J, by two retarding devices one of which has a depending arm N, pivoted to a projection from the case and provided with an adjustable weight and also with a tappet projection O. This tappet is for engagement with the restraining weight P, pivoted to the same projection as the arm N. The other retarding device is of like construction but has its parts reversed. Its depending arm Q, is pivoted to a projection from the case which in this instance is shown as constructed in one piece with the projection carrying the arm N, but both of these projections may be formed independently on the case, or be independently connected thereto. Said arm Q, is also provided with an adjustable weight and with a tappet R, for engagement with the restraining weight S pivoted above it.

The retarding devices may be modified in various ways as shown in Figs. 4 and 5. The adjustable weight may be omitted from the arms N and Q, and may be added to the restraining weights P and S, as indicated at T, Fig. 4, or in place of the restraining weights, may be used springs as S', Fig. 5, the tension of which may be controlled by set screws as indicated at U. When the member B, contracts and causes arm J, to turn toward the left the upper end of said arm engages the beveled face of arm N, and is slightly retarded thereby, and as it progresses it is still further retarded by the tappet engaging the pivoted weight P, or equivalent restraining device which has to be lifted a certain distance before the arm J can pass the retarder. The arm J, is thus retarded through the period of lost motion, as in the instance cited five degrees, or until member B, has contracted to the minimum limit, then said arm snaps past the retarder and the contact I plunges instantaneously into the mercury cup. The circuit is now completed to the regulator which operates until the member B, on expanding has caused the arm J, to gradually move toward the right, against the action of the retarding mechanism, till the maximum degree is reached, when said arm, having passed through the period of lost motion of five degrees, snaps by the retarding device and instantaneously breaks the circuit to the regulator. The arm J, not only snaps by the retarding device upon which it has just acted but passes freely beyond the other retarding device so as to be on the proper side thereof when the reverse action of the member B takes place.

It will be noticed that the movable contact I, has a progressive motion during which it is retarded until a certain point is reached when it passes quickly from the retarding mechanism into or out of engagement with the fixed contact.

The adjustable weights on the arms N and Q, are for the purpose of varying the positions of the beveled end of said arms. These might be omitted and the arms positioned when first inserted.

The degrees at which the circuit is made and broken may be marked upon the glass cover of the case over the respective positions assumed by the arm J, as the circuit is made and broken.

I do not desire to be limited to the exact construction shown and described as it may be modified in many ways without departing from my invention.

What I claim as my invention is—

1. In a circuit controller for regulators, the combination with an expanding and contracting member, of a pair of electrical contacts movable with relation to each other, a retarding mechanism controlling said movement in a manner to cause said contacts to remain disconnected during a fixed period of lost motion and then to pass instantaneously into complete engagement with each other.

2. In a circuit controller for regulators, the combination of a fixed contact, a contact progressively movable in its engagement with said fixed contact, and progressively movable in its disengagement from said fixed contact, and retarding mechanism controlling said movable contact in its movement in each direction.

3. In a circuit controller for regulators, the combination of a fixed contact, a contact progressively movable in its engagement with and its disengagement from said fixed contact, and mechanism retarding the movement of said movable contact in each direction during a stated interval and then instantaneously releasing it.

4. In a circuit controller for regulators, the combination with an expanding and contracting member, of a fixed contact, a movable contact, and a retarding device controlling said movable contact.

5. In a circuit controller for regulators, the combination of a fixed contact, a movable contact and two retarding devices in the path of said movable contact, spaced apart to allow fixed periods of lost motion between the engagement and disengagement of the contacts, for the purpose described.

6. In a circuit controller for regulators, the combination with an expanding and contracting member, of a fixed contact, a movable contact and two retarding devices controlling the movement of the movable contact in either direction, as and for the purpose described.

7. In a circuit controller, the combination of a fixed mercury contact, a movable contact for engagement therewith, a rotary arm connected with said movable contact, and weighted retarding arms in the path of said rotary arm, for the purpose described.

8. In a circuit controller, the combination of a fixed contact, a rotating contact for engagement therewith, a counterbalanced arm connected to said rotating contact, and weighted retarding devices in the path of said arm, as and for the purpose set forth.

9. In a circuit controller, the combination of a fixed contact, a movable contact for engagement therewith, a rotary arm operating said movable contact, retarding devices in the path of said arm consisting of weighted arms and additional restraining devices lifted by said arms.

10. In a circuit controller the combination of electrical contacts, an arm operating one of said contacts and retarding devices acting upon said arm and consisting of depending arms carrying tappets and adjustable weights and restrained weights lifted by said tappets, as and for the purpose set forth.

11. In a circuit controller for regulators, the combination with a contracting and expanding member, of a sector gear linked thereto, a shaft provided with a pinion and rotated by said gear, a contact carried by said shaft, a fixed contact for engagement therewith, an arm also connected to said shaft, and retarding mechanism acting upon said arm as set forth.

Signed at New York, in the county of New York and State of New York, this 8th day of May, A. D. 1893.

BARTON B. WARD.

Witnesses:
  WM. H. CAPEL,
  THOS. F. CONREY.